(12) United States Patent
Woodward

(10) Patent No.: US 10,151,440 B2
(45) Date of Patent: Dec. 11, 2018

(54) FLEXIBLE LED LAMP ASSEMBLY

(71) Applicant: Magna International, Inc., Aurora (CA)

(72) Inventor: Ronald Owen Woodward, Yorktown, VA (US)

(73) Assignee: Magna International Inc., Aurora (CA)

( * ) Notice: Subject to any disclaimer, the term of this patent is extended or adjusted under 35 U.S.C. 154(b) by 189 days.

(21) Appl. No.: 15/111,543

(22) PCT Filed: Jan. 15, 2015

(86) PCT No.: PCT/IB2015/050318
§ 371 (c)(1),
(2) Date: Jul. 14, 2016

(87) PCT Pub. No.: WO2015/107480
PCT Pub. Date: Jul. 23, 2015

(65) Prior Publication Data
US 2016/0334073 A1    Nov. 17, 2016

Related U.S. Application Data

(60) Provisional application No. 61/928,674, filed on Jan. 17, 2014.

(51) Int. Cl.
*B60Q 1/02* (2006.01)
*F21S 8/10* (2006.01)
(Continued)

(52) U.S. Cl.
CPC ............ *F21S 48/1388* (2013.01); *B60Q 1/20* (2013.01); *F21S 41/147* (2018.01); *F21S 41/19* (2018.01);
(Continued)

(58) Field of Classification Search
CPC ... F21S 41/321; F21W 2102/00; F21V 13/04; F21V 5/04
(Continued)

(56) References Cited

U.S. PATENT DOCUMENTS

2005/0094402 A1  5/2005 Albou
2005/0135109 A1* 6/2005 Stout ................. F21V 5/04
362/509
(Continued)

FOREIGN PATENT DOCUMENTS

EP    1471305 A1   10/2004
EP    1881264 A1    1/2008
EP    2282110 A2    2/2011

*Primary Examiner* — William J Carter
(74) *Attorney, Agent, or Firm* — Harness, Dickey & Pierce, P.L.C.

(57) ABSTRACT

A lamp assembly operable to project light in a forward direction along an optical axis includes at least one light emitting device, a first light collector and a second light collector. The at least one light emitting device includes a light emitting surface. The first light collector is disposed on a first side of the light emitting device and defines a first axis. The first light collector is symmetrically disposed about the first axis. The second light collector is disposed on a second side of the light emitting device opposite the first side and defines a second axis. The second axis is substantially aligned with the first axis. The second light collector is symmetrically disposed about the second axis. The first and second axes are tangential to the light emitting surface.

22 Claims, 7 Drawing Sheets

(51) Int. Cl.
- *F21S 41/36* (2018.01)
- *B60Q 1/20* (2006.01)
- *F21S 41/19* (2018.01)
- *F21S 41/147* (2018.01)
- *F21S 41/20* (2018.01)
- *F21S 41/24* (2018.01)
- *F21S 41/255* (2018.01)
- *F21S 41/26* (2018.01)
- *F21S 41/32* (2018.01)
- *F21S 41/33* (2018.01)

(52) U.S. Cl.
CPC ............. *F21S 41/24* (2018.01); *F21S 41/255* (2018.01); *F21S 41/26* (2018.01); *F21S 41/285* (2018.01); *F21S 41/321* (2018.01); *F21S 41/338* (2018.01); *F21S 41/36* (2018.01)

(58) Field of Classification Search
USPC .................................................. 362/459–549
See application file for complete search history.

(56) References Cited

U.S. PATENT DOCUMENTS

| | | | |
|---|---|---|---|
| 2007/0236951 A1* | 10/2007 | Albou | F21S 41/147 362/507 |
| 2010/0277940 A1* | 11/2010 | Ishida | F21S 41/147 362/538 |
| 2011/0122637 A1* | 5/2011 | Futami | F21S 41/147 362/519 |
| 2011/0199777 A1* | 8/2011 | Naganawa | F21S 41/147 362/539 |
| 2011/0199778 A1* | 8/2011 | Okubo | F21S 41/147 362/539 |
| 2013/0242585 A1 | 9/2013 | Brendle | |

* cited by examiner

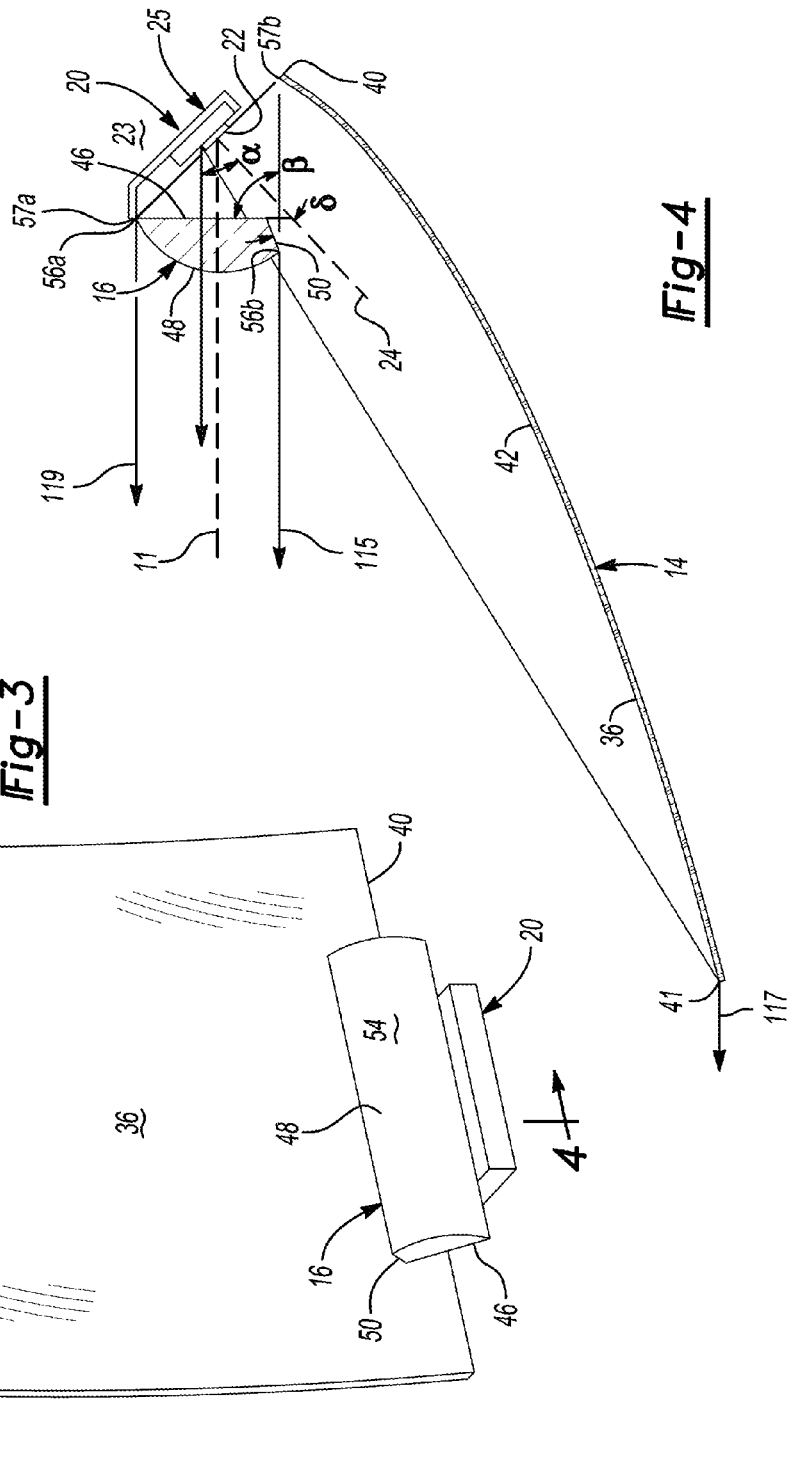

FLEXIBLE LED LAMP ASSEMBLY

CROSS-REFERENCE TO RELATED APPLICATIONS

This application is a U.S. National Phase Application under 35 U.S.C. 371 of International Application No. PCT/IB2015/050318 filed on Jan. 15, 2015 and published as WO2015/017480 on Jul. 23, 2015. This application also claims the benefit of priority of U.S. Provisional Application No. 61/928,674 filed on Jan. 17, 2014. The disclosures of all of the above applications are incorporated herein by reference.

FIELD

The present disclosure relates to an improved light emitting diode (LED) lamp assembly, and particularly to a flexible LED fog lamp assembly.

BACKGROUND

Lamp and light assemblies, including headlamps and fog lamps, are often used in automobiles and other motorized vehicles to control and focus a light pattern in a desired direction. The light may be produced by an incandescent bulb, a halogen bulb, a light emitting diode (LED) or other light source and transmitted to and from a series of reflectors and/or lens, prior to being delivered to the path of the vehicle. Some lamp and light assemblies, such as fog lamps, suffer from low optical efficiency and/or poor light beam pattern distribution. In order to improve the performance and efficiency of a lamp assembly such as a fog lamp assembly, it may be desirable to produce a beam pattern characterized by relatively sharp cutoffs and a near logarithmic decrease in intensity from the cutoff to the foreground, while utilizing small lamp assembly.

This section provides background information related to the present disclosure which is not necessarily prior art.

SUMMARY

This section provides a general summary of the disclosure, and is not a comprehensive disclosure of its full scope or all of its features.

A lamp assembly operable to project light in a forward direction along an optical axis includes at least one light emitting device, a first light collector and a second light collector. The at least one light emitting device includes a light emitting surface. The first light collector is disposed on a first side of the light emitting device and defines a first axis. The first light collector is symmetrically disposed about the first axis. The second light collector is disposed on a second side of the light emitting device opposite the first side and defines a second axis. The second axis is substantially aligned with the first axis. The second light collector is symmetrically disposed about the second axis. The first and second axes are tangential to the light emitting surface.

According to another particular aspect, a lamp assembly operable to project light in a forward direction along an optical axis includes at least one light emitting device and a first reflector. The at least one light emitting device includes a first laterally extending edge, a second laterally extending edge opposite the first laterally extending edge, a first longitudinally extending edge, and a second longitudinally extending edge opposite the first longitudinally extending edge. The first longitudinally extending edge extends between and connects the first laterally extending edge and the second laterally extending edge. The second longitudinally extending edge extends between and connects the first laterally extending edge and the second laterally extending edge. The first reflector is disposed along the first laterally extending edge of the light emitting device. The first reflector is symmetrically disposed about an axis that is substantially aligned with the first longitudinally extending edge.

According to yet another particular aspect, a lamp assembly operable to project light in a forward direction along an optical axis includes a light emitting device, a lens, a reflector, a first light collector, and a second light collector. The lens is arranged to receive a first portion of light from the light emitting device and is operable to refract the first portion of light in the forward direction along the optical axis. The reflector is arranged to receive a second portion of light from the light emitting device and is operable to reflect the second portion of light in the forward direction along the optical axis. The first light collector is arranged to receive a third portion of light from the light emitting device. The first light collector is operable to reflect the third portion of light to at least one of the lens and the reflector. The second light collector is arranged to receive a remaining portion of light from the light emitting device. The second light collector is operable to reflect the remaining portion of light to at least one of the lens and the reflector. The lens and the reflector are operable to project the third portion of light and the remaining portion of light in the forward direction along the optical axis.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3 is another perspective view of the fog lamp assembly of FIG. 1, the assembly shown with light collectors obscured by the lens;

FIG. 4 is a cross-sectional side view of the fog lamp assembly of FIG. 3 taken along the line 4-4 of FIG. 3, showing the ray traces produced by a lens and a reflector;

Corresponding reference numerals indicate corresponding parts throughout the several views of the drawings.

DETAILED DESCRIPTION

Example embodiments will now be described more fully with reference to the accompanying drawings.

Figure 1:
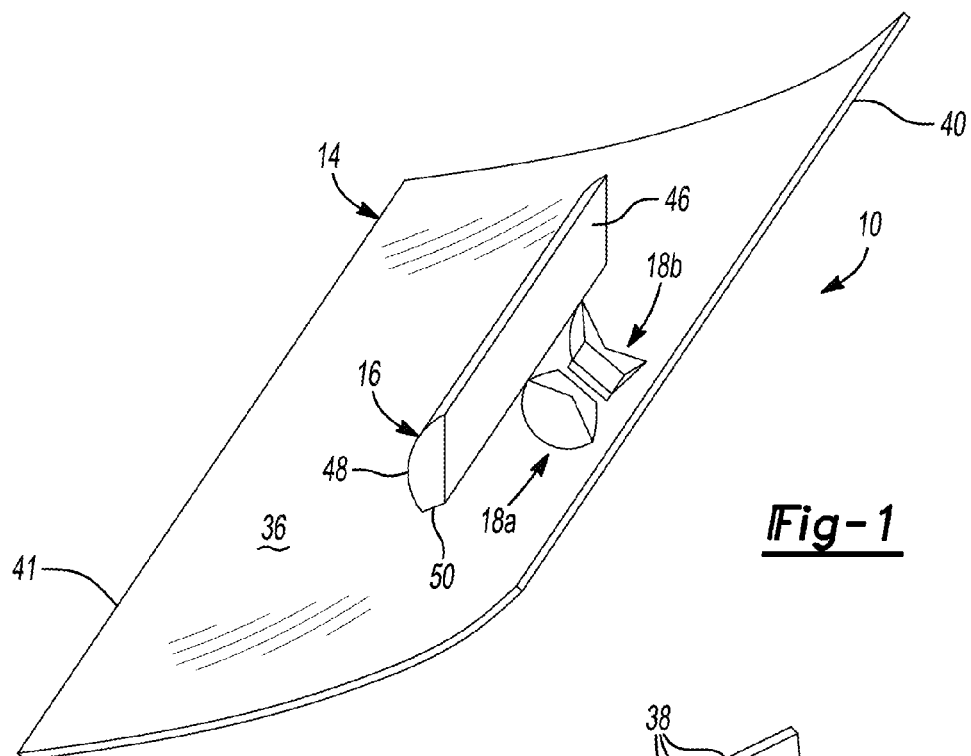
FIG. 1 is perspective view of a fog lamp assembly, in accordance with the principles of the present disclosure.

With reference to FIG. 1, a lamp assembly 10 is provided and may include a light source or light emitting device 12, a reflector 14, a lens 16, a first light collector 18a, and a second light collector 18b. As illustrated in FIG. 4, the lamp assembly 10 may be used to project light in a forward direction along an optical axis 11. In the example embodiment, the lamp assembly 10 is a fog lamp for use in an automobile or other motorized vehicle. In other embodiments, the lamp assembly 10 may be a headlamp assembly having high beam and low beam light projecting portions (not shown).

In the example embodiment, the light emitting device 12 is a light emitting diode. In other embodiments, the light emitting device 12 may be another flat, Lambertion light emitting devices. In one configuration, the light emitting device 12 is fixed to a heat sink and/or a mount member 20. The mount member 20 may include a circuit board (not shown) mounted thereto.

Figure 2:
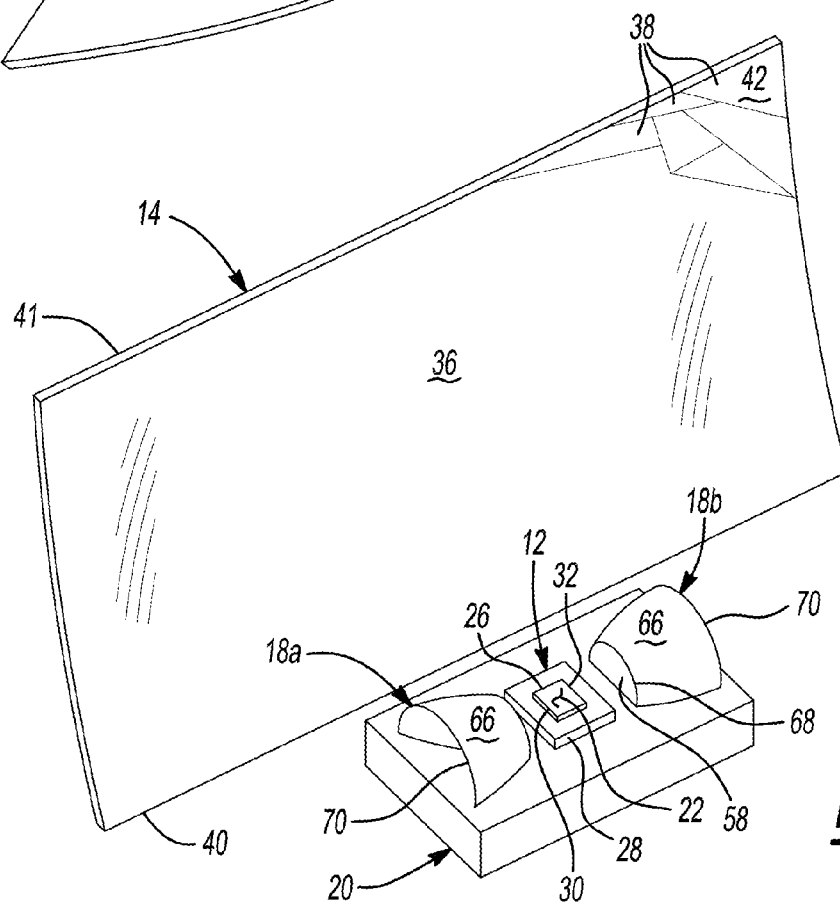
FIG. 2 is another perspective view of the fog lamp assembly of FIG. 1, the assembly shown without a lens.
Figure 5A:
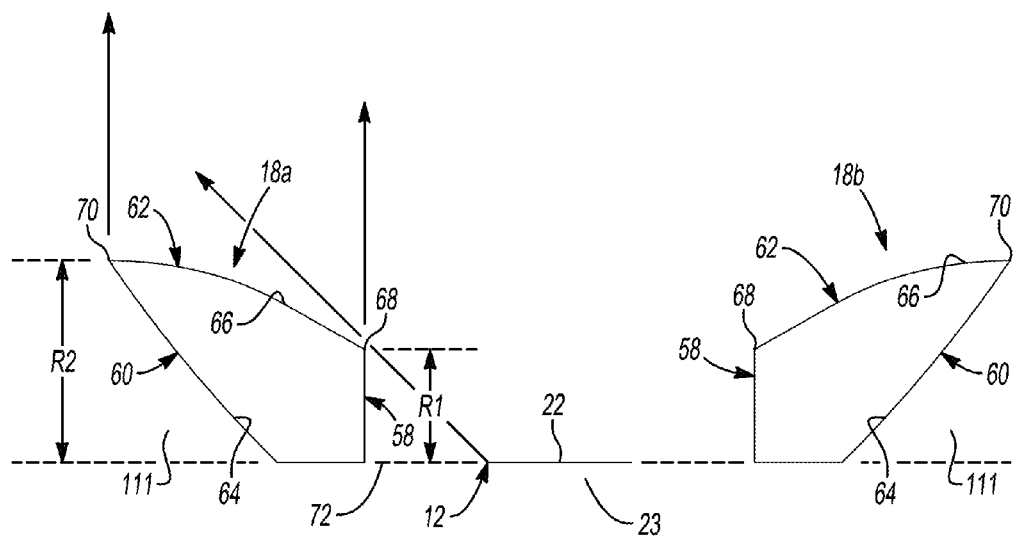
FIG. 5A is a cross-sectional top view of the fog lamp assembly of FIG. 7 taken along the line 5-5 of FIG. 7, showing the ray traces produced by at least one light collector prior to being directed to a lens and a series of reflective elements.
Figure 10:
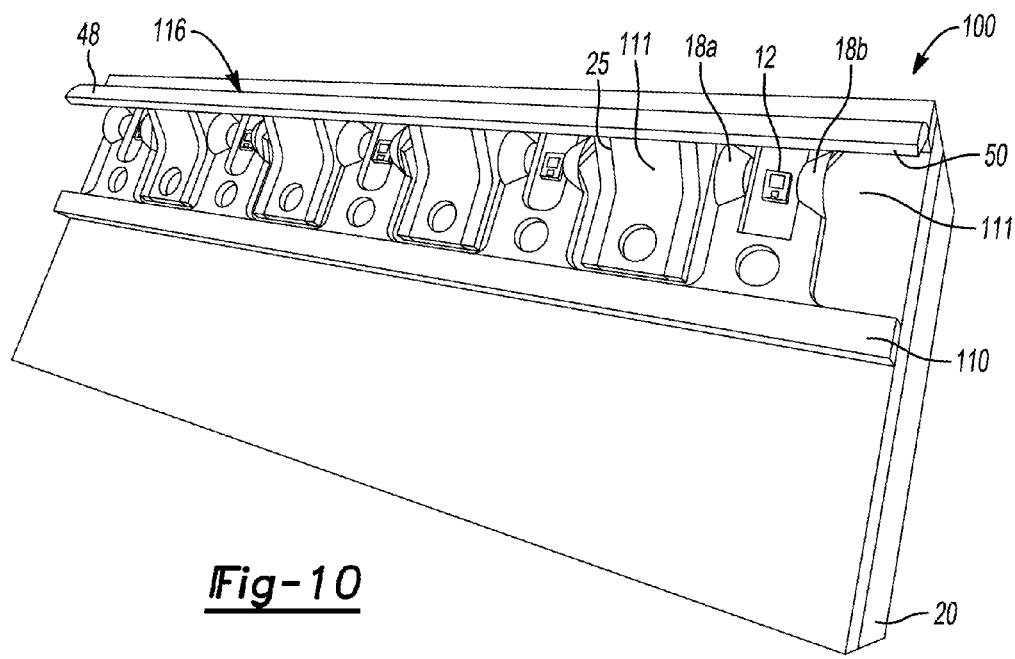
FIG. 10 is a perspective view of a first side of the fog lamp assembly of FIG. 8, showing one possible configuration of an attachment feature for a lens and a light collector without a reflector.
Figure 11:
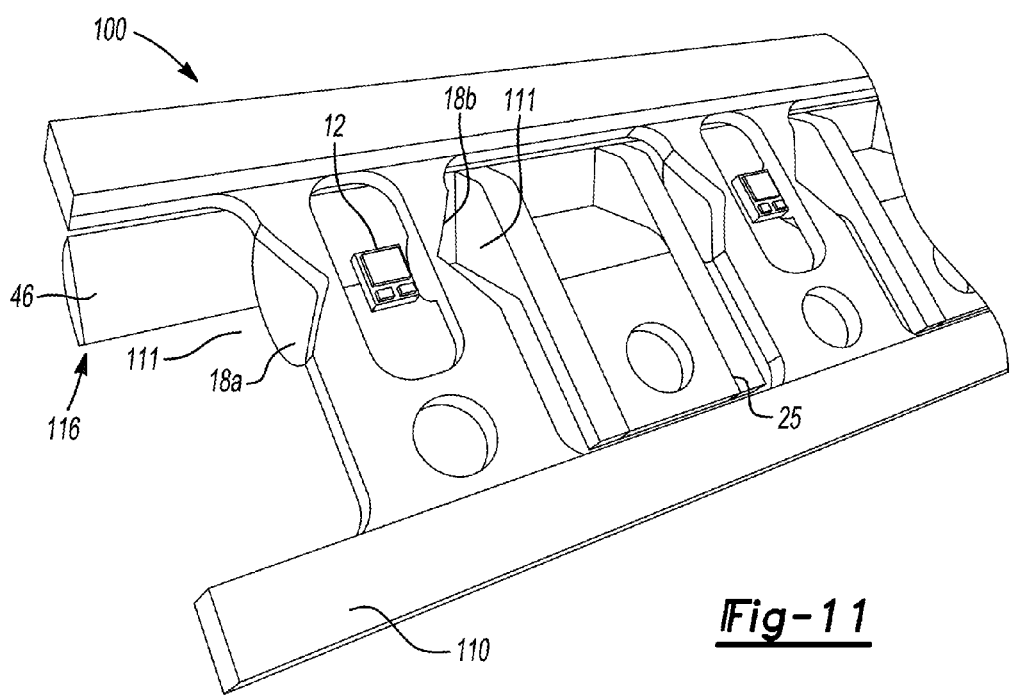
FIG. 11 is a perspective view of a second side of the fog lamp assembly of FIG. 10, shown without a heatsink, a circuit board and a reflector.

As illustrated in FIGS. 2 and 4, the light emitting device 12 may include a light emitting surface 22. A normal 24 to the light emitting surface 22 may be disposed at an angle α relative to the optical axis 11. In the example embodiment, the angle α is substantially equal to forty-five (45) degrees relative to the optical axis 11. Additionally, the normal 24 to the light emitting surface 22 may be angularly offset from a horizontal plane by approximately forty-five (45) degrees. The angular configuration of the light emitting surface 22 creates a dead zone 23 (FIG. 4), or a space in which no light is transmitted, opposite the light emitting surface 22. The dead zone 23 is substantially aligned with mount member 20. Accordingly, none of the light emitted from the light emitting surface 22 is blocked by, or otherwise transmitted into, the mount member 20. It will also be appreciated that other features, such as at least one lens support 25, the first and second light collectors 18a, 18b, and/or supports 110 (FIG. 10), may be located in the dead zone 23 in order to ensure that such features will not impact optical performance of the lamp assembly 10 by blocking any of the light transmitted from the light emitting device 12. As illustrated in FIG. 5A, on either side of the first and second light collectors 18a, 18b, a secondary dead zone 111 is created. The secondary dead zone 111 can be used for the at least one lens support 25, as shown in FIG. 10 and FIG. 11. During operation of the lamp assembly 10, described in more detail below, the arrangement described above creates a desirable mix of optical images.

Figure 7:
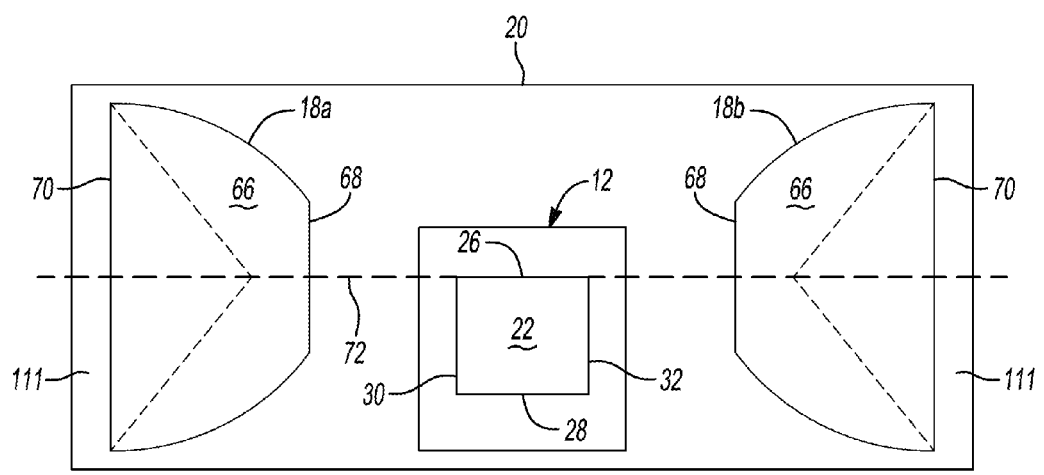
FIG. 7 is a view of perpendicular to a light emitting surface of the fog lamp assembly of FIG. 1, the assembly shown without a lens and without a reflector.

With reference to FIG. 7, the light emitting surface 22 may be defined by a first longitudinally extending edge 26, a second longitudinally extending edge 28, a first laterally extending edge 30, and a second laterally extending edge 32. The first longitudinally extending edge 26 is opposite and substantially parallel to the second longitudinally extending edge 28. The first laterally extending edge 30 is opposite and substantially parallel to the second laterally extending edge 32. The first and second laterally extending edges 30, 32 extend between and connect the first and second longitudinally extending edges 26, 28.

An inner surface 36 of the reflector 14 may include an array of reflective elements 38 as seen in FIG. 2. In the example embodiment, the inner surface 36 is substantially concave, extending from a proximal edge or end 40 to a distal edge or end 41. The proximal end 40 of the inner surface 36 may be substantially located in a plane defined by the light emitting surface 22, such that the distal end 41 of the inner surface 36 captures the light from the light emitting surface 22. The reflective elements 38 may be variously-sized and shaped, and may include a reflective surface 42. The reflective surface 42 of each reflective element 36 may be disposed at an angle with respect to the optical axis 11, such that light from the light emitting device 22 reflects from each of the reflective elements 38 along, and generally in the direction of, the optical axis 11.

The lens 16 may be mounted within the lamp assembly 10 using the lens support 25. In the example embodiment, the support 25 is mounted to the mount member 20. In other embodiments, the support 25 may be mounted in other locations and in other configurations such that the support 25 is generally located within the dead zone 23, opposite the light emitting surface 22 of the light emitting device 12, and within dead zone 111 created by collectors 18a and 18b.

The lens 16 may be a truncated semi-cylindrical construct having a light receiving side 46, a light projecting side 48, and a truncated side 50. In the example embodiment, the lens 16 may be formed from plastic. In other embodiments, the lens 16 may be formed from a crystal, a glass, or another suitable composite. As illustrated in FIG. 1, the light receiving side 46 may be disposed opposite the light projecting side 48. The light receiving side 46 may face the light emitting surface 22 of the light emitting device 12. The light receiving side may form a ninety degree angle with a horizontal plane and the optical axis 11 and may be angularly offset from the normal 24 of the light emitting surface 22 by an angle α, as illustrated in FIG. 4. In the example embodiment, the angle α is substantially equal to forty-five degrees. As illustrated in FIG. 3, the light projecting side 48 of the lens 16 may include a generally arcuate surface 54 having a convex configuration.

As illustrated in FIGS. 1 and 3, the truncated side 50 of the lens 16 generally defines a planar surface (not shown) extending between and connecting the light receiving side 46 and the light projecting side 48. The truncated side 50 helps to ensure that light emitted from the light emitting surface 22 reaches the distal end 41 of the inner surface 36 of reflector 14 without first hitting the lens 16. In this regard, the truncated side 50 may be angularly offset from the normal 24 of the light emitting surface 22 by an angle β, as illustrated in FIG. 4. In the example embodiment, the angle β is substantially equal to twenty-two degrees.

With reference to FIG. 4, when the light emitting device 12 is illuminated, the profile of the light receiving side 46 of the lens 16 may project back along the optical axis 11 in the direction of the light emitting device 12. The size of the lens 16, and its proximity to the light emitting device 12, ensures that a first edge 56a, opposite reflector 14, of a projected profile of the lens 16 is substantially aligned with a first edge 57a of the dead zone 23. Likewise, the proximal end 40 of the reflector 14 is substantially aligned with a second edge 57b of the dead zone 23. By balancing the size of reflector 14 and the size of the aforementioned projected profile of the lens 16, the proximal end 40 of the reflector 14 and a second edge 56b of the lens 16 will substantially align with a ray of light 115 projected from the reflector 14. This ensures that the light from the reflector 14 does not interact or interfere with the optics on the lens 16, while also ensuring that the lens 16 and the reflector 14 only receive light directly from the light emitting device 12 and/or the first and second light collectors 18a, 18b, while also substantially controlling all the light emitted from light emitting device 12.

While the lamp assembly 10 is generally described herein as including a light emitting device 12 and a lens 16, it will be appreciated that the lamp assembly 10 may include more than one light emitting device 12 and/or lens 16 to produce a high and/or low-beam light pattern. Such a configuration is disclosed in commonly owned U.S. patent application 61/867,327, which is herein incorporated by reference in its entirety.

As illustrated in FIG. 10 and FIG. 11, the first and second light collectors 18a, 18b may be mounted within the lamp assembly 10 using a ladder structure 110 attached to the mount member 20. The second light collector 18b may be substantially similar to the first light collector 18a. Accordingly, except as otherwise provided, references herein to a light collector 18 will be understood to apply equally to the first and second light collectors 18a, 18b.

Figure 5B:
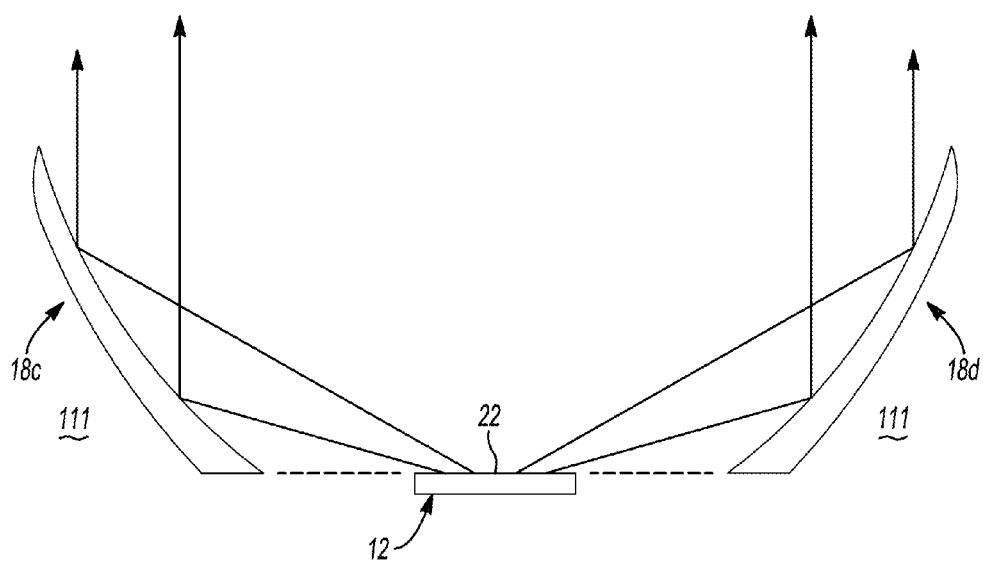
FIG. 5B is a cross-sectional top view of the fog lamp assembly of FIG. 7 taken along the line 5-5 of FIG. 7, showing the ray traces produced by an alternative embodiment for the light collectors.

In the example embodiment, the light collector 18 is formed from plastic. In other embodiments, the light collector 18 may be formed from a crystal, a glass, or another suitable composite. The light collector 18 may include a light receiving side 58, a light reflecting side 60, and a light refracting or projecting side 62. As illustrated in FIG. 2, the light receiving side 58 may face the light emitting device 12 and may include a substantially semi-circular shape. As illustrated in FIG. 5A, the light reflecting side 60 may include a TIR reflective surface 64. The reflective surface 64 may be substantially semi-conical in shape, and may generally face the light receiving side 58. While the light reflecting side 60 is generally described as including a reflective surface 64, it will also be appreciated that the light reflecting side 60 may include more than one reflective element (not shown) fixed to the surface 64. Alternatively, light collectors 18a, 18b may be replaced with reflector members 18c, 18d as seen in FIG. 5B. In this example, the reflective surface of the reflector members 18c, 18d directs the light received from the light emitting device 12 in a forward direction along the optical axis 11 in a similar manner to light collectors 18a, 18b. Other types of light collectors performing this function are also contemplated by this disclosure.

Figure 6:
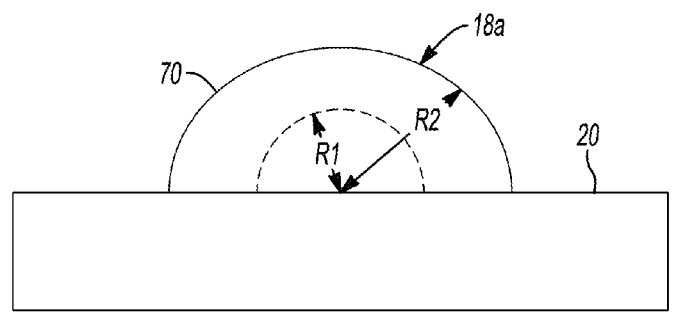
FIG. 6 is an end view of the fog lamp assembly of FIG. 1, the assembly shown without a lens and without a reflector.

With reference to FIG. 2, the light projecting side 62 may include an arcuate surface 66 extending between and connecting the light receiving side 58 and the light reflecting side 60. In this regard, a first longitudinal, or proximal, end 68 of the arcuate surface 66 may be substantially semi-circular, defining a radius R1. A second longitudinal, or distal, end 70 of the arcuate surface 66 may be substantially semi-circular, defining a radius R2. As illustrated in FIG. 6, in the example embodiment, R1 is approximately one-half of R2. In other embodiments, R1 may be more or less than one-half of R2.

The light collector 18, including the light receiving side 58, the light reflecting side 60, and the light projecting side 62 may be symmetrical about a central and longitudinally extending axis 72. In this regard, the light projecting side 62 may be defined by revolving a complex curve substantially one hundred eighty degrees around the axis 72.

The first and second light collectors 18a, 18b may be disposed on opposite sides of the light emitting device 12. As illustrated in FIGS. 1, 2, 5A and 7 in the example embodiment, the first light collector 18a is located adjacent, or otherwise along, the first laterally extending edge 30, and the second light collector 18b is located adjacent, or otherwise along, the second laterally extending edge 32. In the example embodiment, the axis 72 of the light collector 18 is substantially tangential to, or otherwise aligned with, the light emitting surface 22 of the light emitting device 12. In this regard, it will be appreciated that the light emitting surface 22 may be substantially planar. As illustrated in FIG. 7, the axis 72 of the light collector 18 may also be substantially aligned with, or otherwise parallel to, one of the first and second longitudinally extending edges 26, 28 of the light emitting device 12. It will be appreciated that in other embodiments, the first and/or second light collectors 18a, 18b may be in other positions and configurations within the scope of the present disclosure.

Operation of the lamp assembly 10 will now be described in more detail. When the light emitting device 12 is illuminated, a portion of the light may enter the light receiving side 58 of the first and/or second light collectors 18a, 18b. This portion of light may hit and reflect from the reflective surface 64 and/or reflective elements of the first and/or second light collectors 18a, 18b, prior to projecting from the light projecting side 62 of the light collectors 18a, 18b. The location and configuration of the light collectors 18a, 18b, described above, may produce a horizontally collimated light profile, characterized by a fan-shaped beam. The fan-shaped beam projected from the light collectors 18a, 18b may be substantially focused on the reflector 14 or the lens 16.

Figure 9:
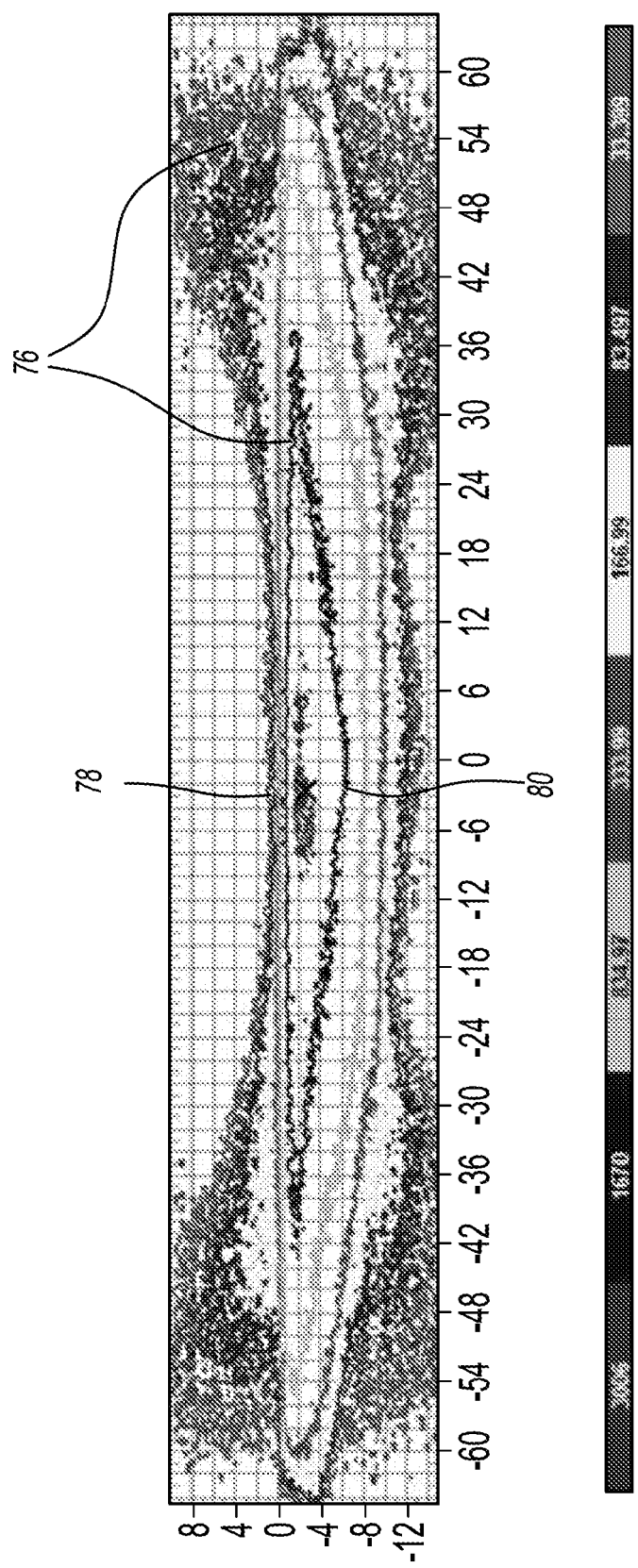
FIG. 9 is an illustration of the light pattern produced by the fog lamp assembly of FIG. 1.

The remainder of the light produced by the light emitting device 12, as well as the fan-shaped beam projected from the light collectors 18a, 18b, may contact the reflector 14 or the lens 16, prior to being projected from the lamp assembly 10 in the direction of the optical axis 11. The location and configuration of the lens 16 relative to the light emitting device 12 and the light collectors 18a, 18b, described above, may produce a vertically collimated light profile, characterized by a fan-shaped beam. The location and configuration of the reflector 14 relative to the light emitting device 12 and the light collectors 18a, 18b, described above, may also produce a vertically collimated light profile, characterized by a fan-shaped beam. In this way, the light emitting device 12 cooperates with the reflector 14, the lens 16 and the light collectors 18a, 18b to produce a light pattern (FIG. 9) characterized by light beams having a substantially blended spread area 76. An upper portion 78 (relative to the ground, or other driving surface in front of the vehicle, and relative to the view in FIG. 9) of the light pattern is characterized by a substantially flat cutoff, and a central portion 80 of the light pattern is characterized by a substantially smooth and/or flat area. In the example embodiment, the combination of the reflector 14 and lens 16 are able to collect and control substantially one hundred percent of the light emitted and/or projected from the light emitting device 12 and the light collectors 18a, 18b, prior to projecting the light from the lamp assembly 10 in the manner described above. Separating the horizontal collimation (light collectors 18a, 18b, as described above) and vertical collimation (reflector 14 and lens 16, as described above) of the light emitted from the light emitting device 12, as described above, allows for a more compact lamp assembly 10, and also allows the lamp assembly 10 to maintain the substantially flat cutoff near the upper portion 78 of the light pattern.

Figure 8:
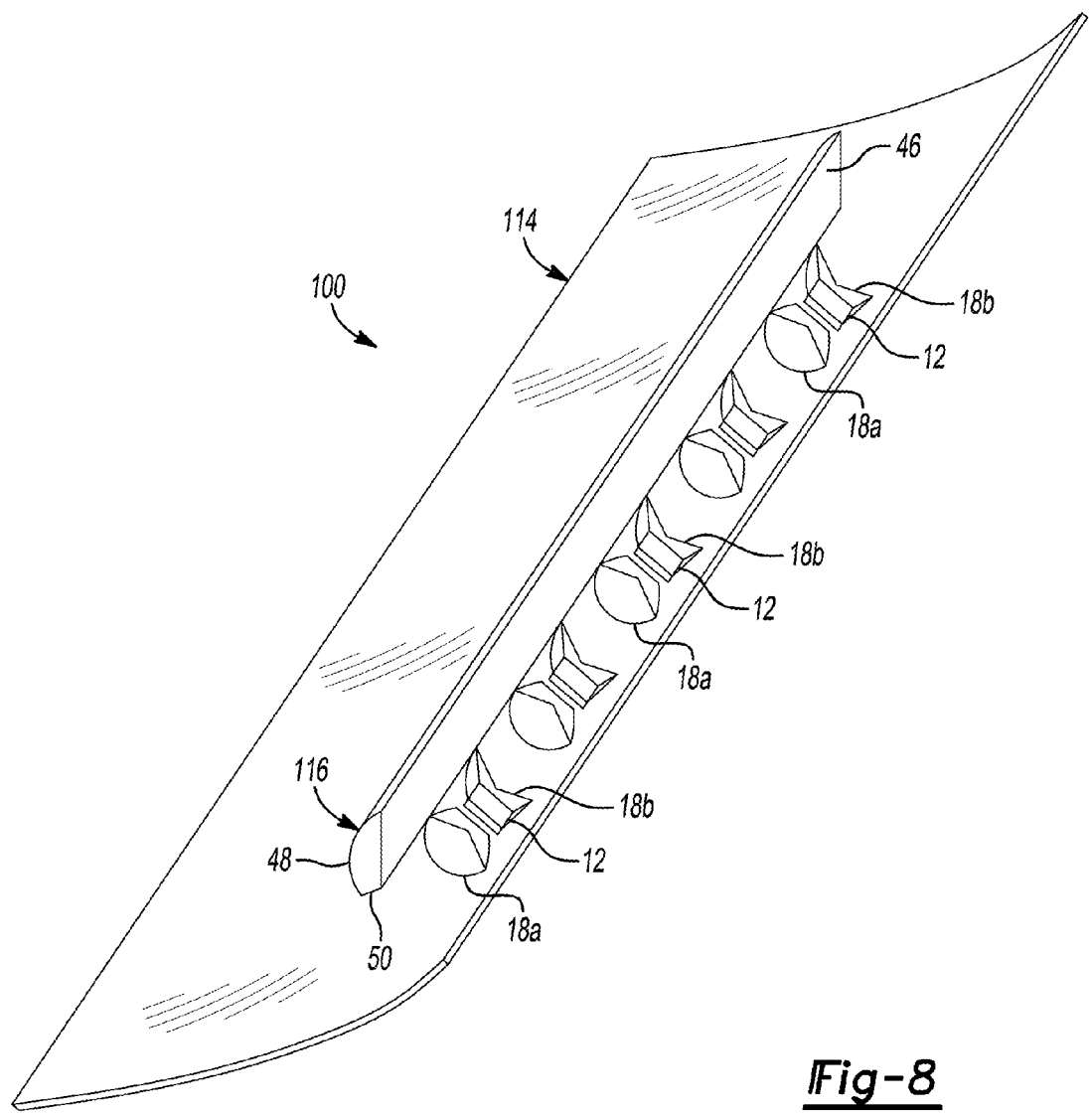
FIG. 8 is a perspective view of another configuration of a fog lamp assembly, in accordance with the principles of the present disclosure.

With reference to FIG. 8, another embodiment of a lamp assembly 100 is shown. The structure and function of the lamp assembly 100 may be generally similar to that of the lamp assembly 10 described above, apart from any exceptions described below and/or shown in the figures. Therefore, similar features will not be described again in detail. The lamp assembly 100 may include more than one light emitting device 12, a reflector 114, a lens 116, and multiple pairs or sets of first and second light collectors 18a, 18b. In the example embodiment, the light emitting devices 12 and the first and second light collectors 18a, 18b are arranged in a linear configuration. It will be appreciated, however, that the light emitting devices 12 and the first and second light collectors 18a, 18b may have other configurations within the scope of the present disclosure. For example, the light emitting devices 12 and the first and second light collectors 18a, 18b may be arranged in an arcuate configuration, such as a circle. Operation of the lamp assembly 100 is substantially the same as the operation of lamp assembly 10, and will therefore not be described again in detail, except that the multiple light emitting devices 12 and multiple pairs of first and second light collectors 18a, 18b in the lamp assembly 100 may allow the lamp assembly 100 to produce a light pattern having a different shape and/or intensity than the light pattern produced by lamp assembly 10.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A lamp assembly operable to project light as rays in a forward direction, comprising:

a light emitting device having a planar rectangular surface from which light is emitted, wherein the planar rectangular surface is bounded by two opposing lateral edges and two opposing longitudinal edges;

a lens having a planar light receiving surface configured to receive a portion of the light emitted from the light emitting device and operates to direct the light in the forward direction;

a reflector having a parabolic reflecting surface configured to receive remaining portion of the light emitted from the light emitting device and reflect the remaining portion of the light in the forward direction a first light collector adjacent a first lateral edge of the light emitting device and disposed symmetrically about an axis defined by a first longitudinal edge of the two opposing longitudinal edges of the light emitting device, wherein the first light collector receives light from the light emitting device and directs the light to one of the lens or the reflector; and a second light collector adjacent to a second lateral edge of the light emitting device and disposed symmetrically about the axis defined by the first longitudinal edge of the two opposing longitudinal edges of the light emitting device, wherein the first light collector receives light from the light emitting device and directs the light to one of the lens or the reflector.

2. The lamp assembly of claim 1 wherein the first light collector and the second light collector each include a light refracting surface, where the light refracting surface has a shape obtained by revolving a curve substantially one hundred eighty degrees around the axis defined by the first longitudinal edge of the light emitting device.

3. The lamp assembly of claim 1 wherein the planar surface of the light emitting device is oriented at substantially forty-five degrees in relation to the forward direction; and the light receiving surface of the lens is oriented at substantially forty-five degrees in relation to the planar surface of the light emitting device and oriented perpendicular to the forward direction.

4. The lamp assembly of claim 1 wherein the lens is formed in shape of a cylinder cut in half along a longitudinal axis thereof, the lens having a flat surface opposing a curved surface and the flat surface facing the light emitting device.

5. The lamp assembly of claim 4 wherein the curved surface of the lens is truncated on a side facing the parabolic reflecting surface of the reflector.

6. The lamp assembly of claim 1 wherein the planar light receiving surface of the lens intersects with a plane aligned with the planar surface of the light emitting device and thereby receives light emitted substantially parallel to the planar surface of the light emitting device.

7. The lamp assembly of claim 1 wherein the reflector is configured such that light is only reflected once off a surface thereof.

8. The lamp assembly of claim 1 wherein the reflector is positioned around the lens and the light emitting device and has a reflecting surface with shape obtained by revolving a parabola ninety degrees around its axis.

9. The lamp assembly of claim 1 wherein the reflector includes a plurality of segments, each segment shaped parabolic shape.

10. The lamp assembly of claim 1 wherein the light emitting device is a light emitting diode.

11. The lamp assembly of claim 1 wherein the lamp assembly is a fog lamp.

12. The lamp assembly of claim 1 wherein the light emitting device is a light emitting diode.

13. A lamp assembly operable to project light as rays in a forward direction, comprising:
 a housing;
 a light emitting device arranged in the housing and having a planar rectangular surface from which light is emitted, wherein the planar rectangular surface is bounded by two opposing lateral edges and two opposing longitudinal edges;
 a lens arranged in the housing and having a planar light receiving surface configured to receive a portion of the light emitted from the light emitting device and operates to direct the light in the forward direction;
 a reflector arranged in the housing, the reflector having a parabolic reflecting surface configured to receive remaining portion of the light emitted from the light emitting device and reflect the remaining portion of the light in the forward direction
 a first light collector adjacent a first lateral edge of the light emitting device and disposed symmetrically about an axis defined by a first longitudinal edge of the two opposing longitudinal edges of the light emitting device, wherein the first light collector receives light from the light emitting device and directs the light to one of the lens or the reflector; and
 a second light collector adjacent to a second lateral edge of the light emitting device and disposed symmetrically about the axis defined by the first longitudinal edge of the two opposing longitudinal edges of the light emitting device, wherein the first light collector receives light from the light emitting device and directs the light to one of the lens or the reflector.

14. The lamp assembly of claim 13 wherein the first light collector and the second light collector each include a light refracting surface, where the light refracting surface has a shape obtained by revolving a curve substantially one hundred eighty degrees around the axis defined by the first longitudinal edge of the light emitting device.

15. The lamp assembly of claim 13 wherein the planar surface of the light emitting device is oriented at substantially forty-five degrees in relation to the forward direction; and the light receiving surface of the lens is oriented at substantially forty-five degrees in relation to the planar surface of the light emitting device and oriented perpendicular to the forward direction.

16. The lamp assembly of claim 13 wherein the lens is formed in shape of a cylinder cut in half along a longitudinal axis thereof, the lens having a flat surface opposing a curved surface and the flat surface facing the light emitting device.

17. The lamp assembly of claim 16 wherein the curved surface of the lens is truncated on a side facing the parabolic reflecting surface of the reflector.

18. The lamp assembly of claim 13 wherein the planar light receiving surface of the lens intersects with a plane aligned with the planar surface of the light emitting device and thereby receives light emitted substantially parallel to the planar surface of the light emitting device.

19. The lamp assembly of claim 13 wherein the reflector is configured such that light is only reflected once off a surface thereof.

20. The lamp assembly of claim 13 wherein the reflector is positioned around the lens and the light emitting device and has a reflecting surface with shape obtained by revolving a parabola ninety degrees around its axis.

21. The lamp assembly of claim 13 wherein the reflector includes a plurality of segments, each segment shaped parabolic shape.

22. Lamp assembly operable to project light as rays in a forward direction, comprising:
 a light emitting device having a planar rectangular surface from which light is emitted and the planar surface is oriented at substantially forty-five degrees in relation to the forward direction, wherein the planar rectangular surface is bounded by two opposing lateral edges and two opposing longitudinal edges;
 a lens having a planar light receiving surface configured to receive a portion of the light emitted from the light emitting device and operates to direct the light in the forward direction, wherein the light receiving surface of the lens is oriented at substantially forty-five degrees in relation to the planar surface of the light emitting device and oriented perpendicular to the forward direction;
 a reflector having a parabolic reflecting surface configured to receive remaining portion of the light emitted from the light emitting device and reflect the remaining portion of the light in the forward direction a first light collector adjacent a first lateral edge of the light emitting device and disposed symmetrically about an axis defined by a first longitudinal edge of the two opposing longitudinal edges of the light emitting device, wherein the first light collector receives light from the light emitting device and directs the light to one of the lens or the reflector; and a second light collector adjacent to a second lateral edge of the light emitting device and disposed symmetrically about the axis defined by the first longitudinal edge of the two opposing longitudinal edges of the light emitting device, wherein the first light collector receives light from the light emitting device and directs the light to one of the lens or the reflector.

* * * * *